United States Patent
Riesbeck et al.

[11] 3,800,943
[45] Apr. 2, 1974

[54] STACKABLE SIEVE

[76] Inventors: Laverne J. Riesbeck, 5257 Peninsula Dr., Canton, Ohio 44718; Willis A. Blackwell, 413 Linwood Ave., Canton, Ohio 44708

[22] Filed: Feb. 22, 1972

[21] Appl. No.: 228,254

Related U.S. Application Data

[63] Continuation-in-part of Ser. No. 844,768, July 25, 1969, abandoned.

[52] U.S. Cl. .............................. 209/237, 209/403
[51] Int. Cl. .............................................. B07b 1/00
[58] Field of Search ............ 209/403, 405, 408, 237, 209/319, 392; 264/263; 156/229, 293, 329

[56] References Cited
UNITED STATES PATENTS

| | | | |
|---|---|---|---|
| 3,386,580 | 6/1968 | Grabarczyk | 209/408 X |
| 3,243,042 | 3/1966 | Moulton | 209/408 X |
| 3,387,075 | 6/1968 | Wilcox | 264/263 |
| 1,131,768 | 3/1915 | Beach | 209/408 |
| 3,487,625 | 1/1970 | Lucas | 55/514 |
| 3,449,280 | 6/1969 | Frigstad | 260/47 EP X |
| 3,341,013 | 9/1967 | Moulton | 209/408 X |

OTHER PUBLICATIONS

Gregory, "Uses and Applications of Chemicals and Related Materials", 1939, page 7.

*Primary Examiner*—Frank W. Lutter
*Assistant Examiner*—William Cuchlinski, Jr.
*Attorney, Agent, or Firm*—Hamilton, Renner & Kenner

[57] ABSTRACT

A sieve for use primarily in particle size analysis is made of a rigid plastic material. The sieve consists of a plastic frame injection molded in two parts with a screen mesh placed therebetween. The edge of one of the frame members is softened and the screen material is bonded thereto. The frame members are then bonded together with the screen therebetween either by use of an epoxy compound or by means of conventional electro-sonic welding. Silicone rubber can be applied at the point where the screening material meets the plastic frame to insure against screen shearing at the junction points.

6 Claims, 10 Drawing Figures

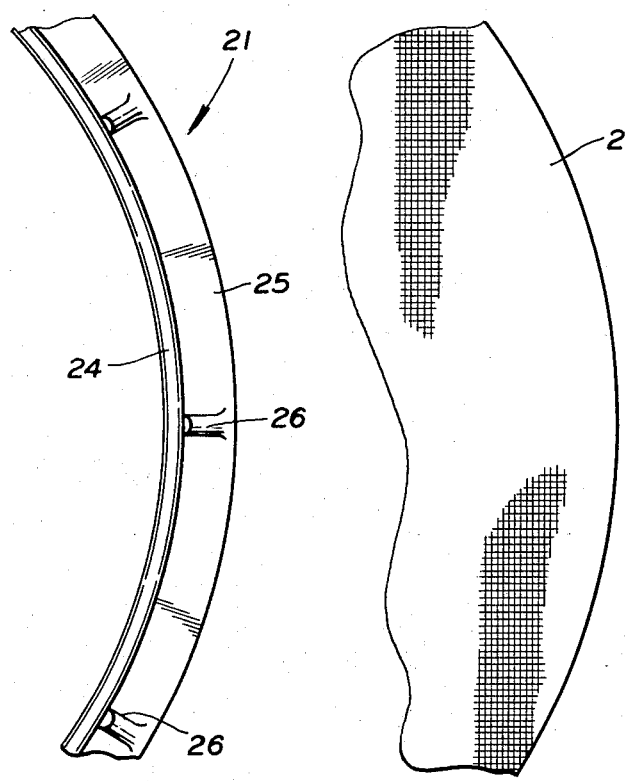
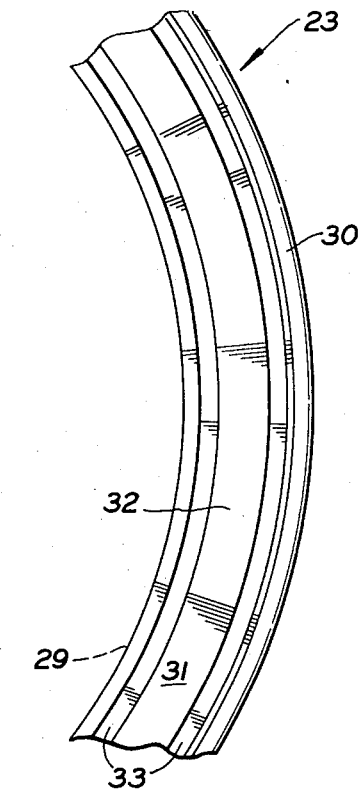
FIG. 3  FIG. 4  FIG. 5
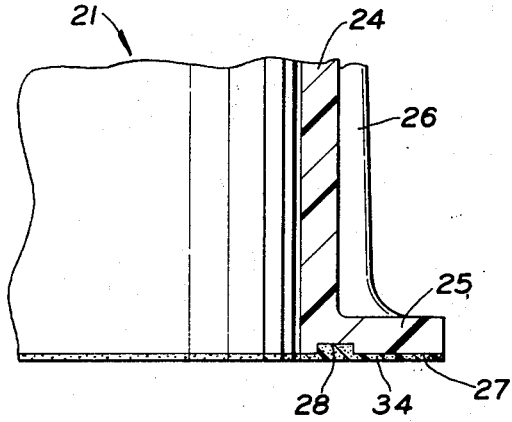
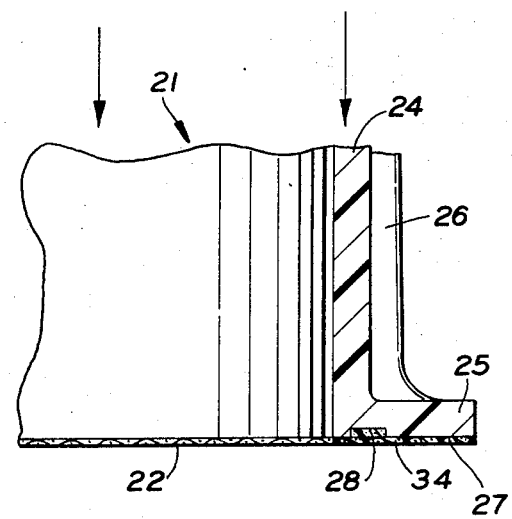
FIG. 6  FIG. 7
INVENTORS
LAVERNE J. RIESBECK
WILLIS A. BLACKWELL
ATTORNEYS

STACKABLE SIEVE

CROSS-REFERENCE TO RELATED APPLICATIONS

This application is a continuation-in-part application of our U.S. Pat. application Ser. No. 844,768, filed July 25, 1969, now abandoned.

BACKGROUND OF THE INVENTION

The invention consists of a plastic sieve. A plurality of such sieves are stacked upon each other and vibrated in material separators to classify the material by size.

Many industries utilize material classifying machines, such as that shown in U.S. Pat. No. 3,035,700, to separate their product by size. Production engineers for these institutions often desire to run smaller scale tests in their laboratories to determine, among other things, the efficiency of the screening process. To this end, the art has developed what has come to be known as testing sieves which are essentially small scale screening devices used in industrial laboratories, technical institutions and the like. While the concept of the present invention could be equally applicable to the large material separating machines, the discussion herein will focus on the primary use in a testing machine.

In making a particle analysis, the industrial engineer, chemist or student will generally use a plurality of sieves nested one above another and arranged so that each screen has openings larger than the one below. The stack of screens is then clamped onto a shaking device and the material to be classified is fed to the top screen. After a few minutes of vibratory or gyratory motion, the stack of screens can be separated and the material remaining in each analyzed for whatever the desired purpose.

The effectiveness of any screening operation will decrease as the screen becomes blinded or as it wears to give uneven hold sizes. When this occurs, the user generally will dispose of the sieve with the worn screen and replace it with a new sieve. Since most sieves presently manufactured are made of a metallic material such as bronze or stainless steel, such frequent disposal amounts to a great expense to the user, the metallic sieves being quite expensive not only because of the material but because of the tedious method of manufacture employed. The manufacture of metallic sieves requires that the screen cloth be welded to the frame while the cloth is held under great tension. This is a slow process since accurate welding is of the utmost importance to maintain screen tension. The welded joint between the screen and the frame also tends to shear quite easily under the constant weight of the material being vibrated thereon. Such shearing, of course, renders the screen totally unusable and results in a test failure.

Similarly, all prior sieves of which we are aware present, when stacked, a smooth outer surface. As such, after a short period of operation, the sieves become extremely difficult to separate, actually tending to adhere to each other. The smooth outer surface does not present satisfactory means to grip the sieves to separate the same.

SUMMARY OF THE INVENTION

It is thus an object of the present invention to provide a sieve of rigid plastic material constructed so as to meet the requisite strength requirements and so that it is more economically disposable after its effectiveness has diminished.

It is another object of the present invention to provide a sieve, as above, which is less susceptible to wearing or shearing at the joint between the frame and the screen.

It is still another object of the present invention to provide a sieve, as above, which is manufactured easily and economically.

It is yet another object of the present invention to provide a plastic sieve with improved wear characteristics.

It is a further object of the present invention to provide a sieve, as above, which can be stacked with other sieves yet easily separated therefrom after use.

These and other objects which will become apparent from the following specification are accomplished by means hereinafter described and claimed.

In general, the sieve of the present invention is manufactured by first injection molding two plastic rings having radially extending flanges thereon which present mating faces. The plastic on the mating face of one of the frame halves is softened with a standard chemical solvent and the frame half is placed on a stretched screen cloth. Weight should be applied so that after a short period of time, the plastic has rehardened and become integral with the screen. An epoxy compound is then applied to the mating faces of the frame halves and the frame is clamped until the epoxy sets. Alternately, the frames may be electro-sonically welded together. A silicone gasket material can be applied at the frame-screen joint so as to insure against shearing.

A preferred embodiment of the present invention is shown by way of example in the accompanying drawings and is hereinafter described in detail without attempting to show all of the various forms and modifications in which the invention might be embodied; the invention being measured by the appended claims and not the details of the specification.

BRIEF DESCRIPTION OF THE DRAWINGS

FIG. 3 is a fragmentary plan view taken substantially along line 3—3 of FIG. 2.

FIG. 4 is a fragmentary view taken substantially along line 4—4 of FIG. 2.

FIG. 5 is a fragmentary view taken substantially along line 5—5 of FIG. 2.

FIG. 6 is an enlarged partial sectional view of one of the frame halves depicted in FIG. 2 having a softening agent applied thereto during the manufacturing process of a sieve according to the present invention.

FIG. 7 is a view sequentially following FIG. 6 in the manufacturing process of a sieve according to the present invention wherein the frame member is now attached to the screen cloth.

DESCRIPTION OF THE PREFERRED EMBODIMENT

Figures 1, 2:
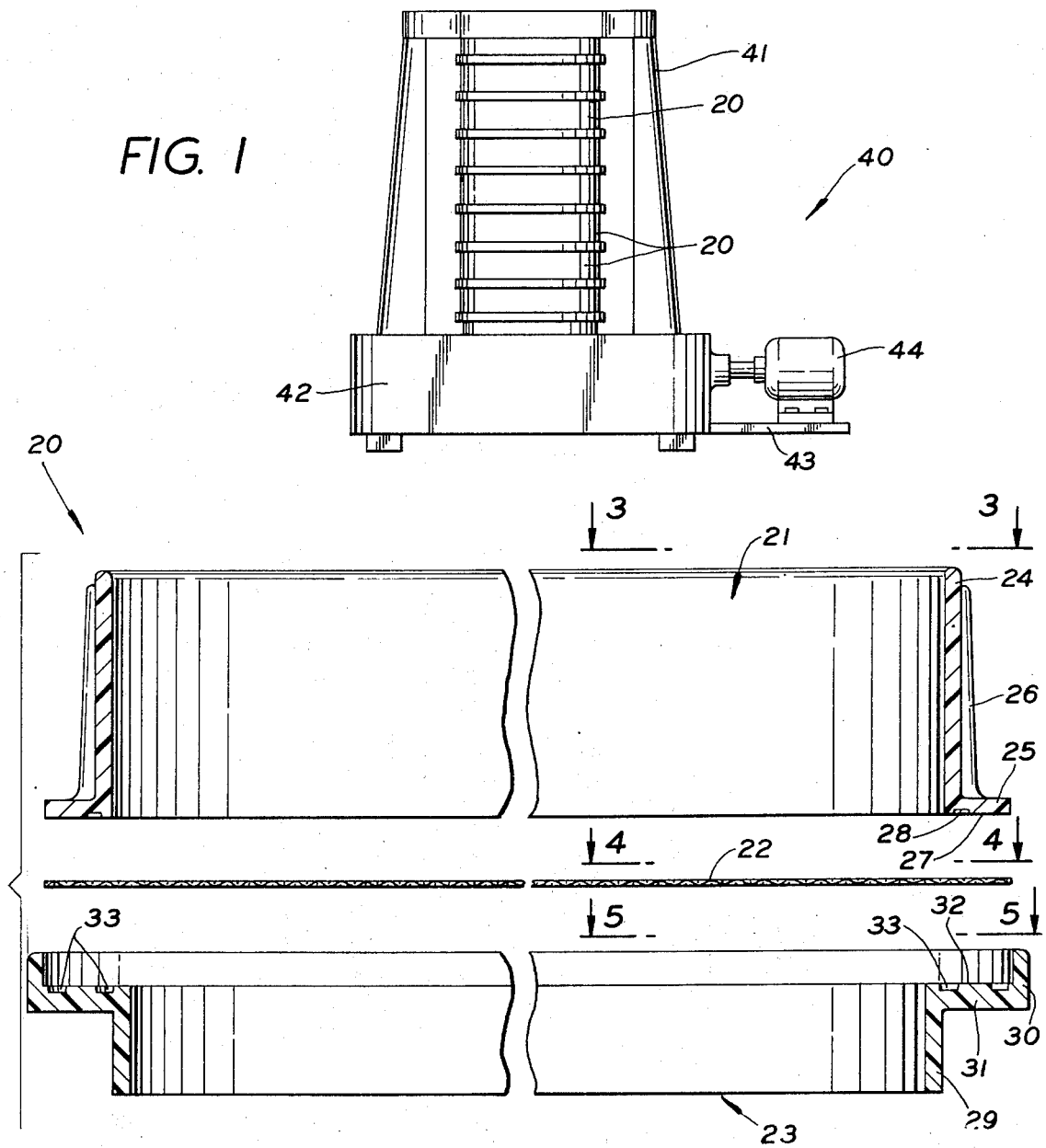
FIG. 1 is an elevational view of a testing sieve shaker having a plurality of the sieves of the present invention stacked thereon.
FIG. 2 is an exploded cross-section of the preferred embodiment of the sieve of the invention showing the two frame halves and the screen member.

A test sieve constructed according to the concept of the present invention is indicated generally by numeral 20 and is shown in FIG. 2 as consisting generally of three components: an upper annular frame member 21, a screen cloth 22, and a lower annular frame member 23.

The frame members 21 and 23 are injection molded out of any suitable rigid thermoplastic, polyvinylchloride and polycarbonate being non-limiting examples thereof. The desirable characteristics of the particular plastic chosen are those of strength and insolubility when contacted by the materials to be classified. Polycarbonate is particularly suitable in that it is highly resiliant to breakage and extreme temperatures as well as being relatively clear, which, of course, affords the user the opportunity to observe the operations of the sieve.

As shown in FIG. 2, upper annular frame member 21 is somewhat L-shaped in cross-section havng an upstanding side portion 24 and a radially directed annular flange portion 25 extending outwardly beyond side portion 24. Extending from the flange portion 25 to the side portion 24 at various points around the upper frame 21 are a series of rib members 26 which serve to add structural strength to the upper frame 21. The rib members 26 are shown as extending nearly the full length of side portion 24. It has been found, however, that in many cases shorter ribs will adequately strengthen upper frame 21. It is also desirable, at times to shorten the overall height of a particular sieve 20. This can readily be done in the manufacturing process by shortening the length of the side portion 24 to make, for example, a half size sieve.

The bottom of the flange portion 25 presents a mating face 27 which, as will hereinafter be described in more detail, is fastened to the screen cloth 22 and the lower annular frame member 23. An annular groove or channel 28 is provided in face 27 of flange 25 to aid in the above-mentioned connections.

The lower annular frame member 23 is somewhat Z-shaped in cross-section having two axially directed flange portions 29 and 30 spanned by a radially directed flange or lip portion 31. The flange portion 29 is downwardly directed (as seen in FIG. 2) and has an outer diameter slightly less than the inner diameter of the upstanding side portion 24 of upper frame 21 so that a plurality of sieves 20 can be stacked snugly as shown in FIG. 1, to be hereinafter more fully explained. Of course, the outside diameter of flange 29 can be provided with rib members similar to members 26 as may be desired to add structural strength to the frame 21. The shorter axial flange portion 30 has an inner diameter slightly larger than the outer diameter of the flange portion 25 of upper frame 21 and is situated at the radially outer end of lip portion 31.

The top of the radially extending lip portion 31 adjacent the flange 30 presents a mating face 32 which is joined with face 27 in a manner to be hereinafter described. Face 32 has two annular channels 33 formed therein similar to the groove 28 in face 27. The lower portion of the lip 31 adjacent the leg 29 acts as a stop surface which rests on the top of the side 24 of another sieve 20 when the sieves are stacked.

In order to assemble the frame members 21 and 23 with the screen cloth therebetween, it has been found most efficient to first apply a softening agent 34 to the face 27 of frame member 21 as shown in FIG. 6. A softening agent found particularly suitable for this function is methyl ethyl ketone (MEK) which is a commercially available solvent that will soften polyvinylchloride and other thermoplastics.

Then the screen cloth 22, which may be a very fine mesh, such as 100 openings per inch, is stretched very tightly and frame member 21 placed thereon so that the screen will be in direct abutment with and engaged by the now softened face 27. Weight is applied to the frame for a period of about five minutes by which time the plastic has re-hardened around the screen. This condition is shown in FIG. 7, the weight being indicated by the arrows. It is now possible at this stage in the manufacturing process to cut the screen cloth at the outer circumference of the flange 25. Since a total circumferential bond has been formed between the plastic and the metal screen along face 27, the screen 22 remains taut across the entire diameter of frame 21.

Then the two frame halves may be fastened together. In one instance an adhesive, such as an epoxy compound 35, can be applied to the mating faces 27 and 32 of frame members 21 and 23, respectively. Alternatively, the mating faces may be electro-sonically welded in a conventional manner. If the epoxy method is utilized, enough epoxy should be applied so as to completely fill the grooves or channels 28 and 33. The frames are then clamped together (arrows, FIG. 8) for a period of about three hours until the epoxy bonds have been completely formed. Due to the presence of channels 28 and 33, the epoxy is allowed to provide a chemical bond deep within each frame 21 and 23.

While many epoxy compounds would be suitable for most industrial situations, the compound selected must be one which will withstand vigorous vibration, and one which will not only chemically bond the thermoplastics but also bond the plastic to the metal of the screen. This latter point is an insurance factor in case the aforementioned softening and hardening process described in conjunction with FIG. 7 should prove inefficient. In fact, it has been found that in the coarser screens, for example, coarser than 20 mesh, the step of softening the face 27 is often less efficient and can be eliminated. On such coarse screens, the epoxy compound provides even a better bond and therefore elimination of the softening procedure does not weaken the sieve.

The epoxy resin found most suitable in obtaining the above-noted results is one made by condensing epichlorohydrin with bisphenol A (diphenylol propane), being cured by the use of a modified polyamine bearing from two to five amino groups, such as diethylenetriamine. An epoxide equivalent (which gives an indication of the degree of reaction between the epoxide and the amino groups) in the range of 175–210 has been found most suitable in assuring a satisfactory bond. It should be noted that other hydroxyl-containing compounds, such as glycerol, clycols, resorcinal and hydroquinone can replace bisphenol A (diphenylol propane) in the condensation process.

Figure 8:
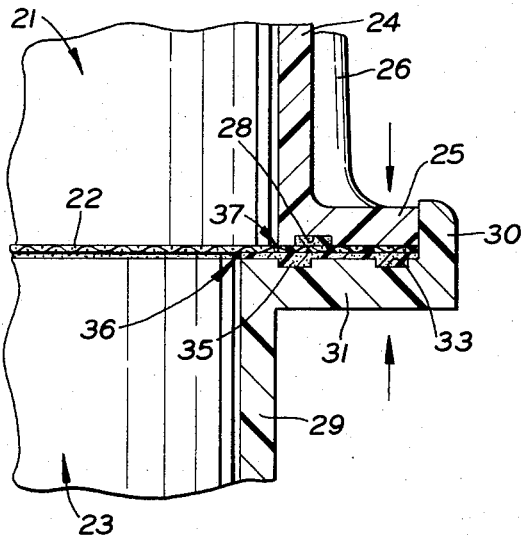
FIG. 8 is a view sequentially following FIG. 7 in the manufacturing process of a sieve according to the present invention wherein the two frame members and the screen depicted in FIG. 2 are now fastened together with an epoxy compound.
Figure 9:
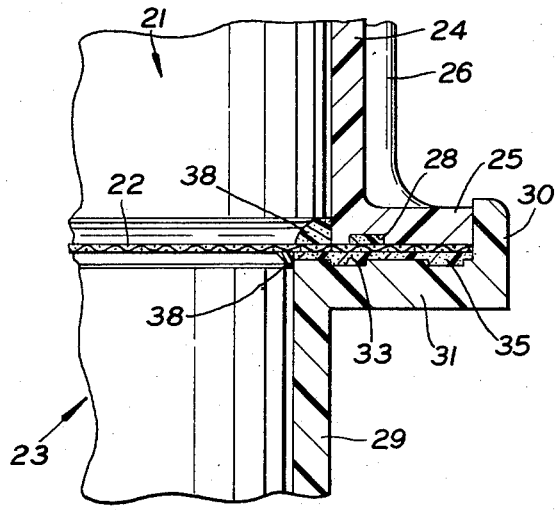
FIG. 9 is a view sequentially following FIG. 8 in the manufacturing process of a sieve according to the present invention wherein a silicone material has been placed at the joints between the screen and the frame.

The now completed sieve 20, a section of which is shown in FIG. 8, consists of the two frames 21 and 23 holding the taut screen 22 therebetween. Screen 22 will, during use, be subjected to external downward forces as material attempts to pass therethrough. Such forces might tend to weaken the screen at edge 36 defined by the junction of leg 29 and lip 31. Further, a corner 37 is formed above the end of leg 29 (where frame member 23 joins screen 22) upon which some material could lodge. To alleviate such conditions that might exist, a silicone rubber material 38 is placed, as shown in FIG. 9, at edge 36 and corner 37 to prevent any possible shearing of the screen or lodging of the material respectively. In many situations, however, silicone 38 is not necessary, it being only desirable where a particularly heavy material might tend to shear the screen at point 36 or when a particularly sticky material might lodge in corner 37.

Figure 10:
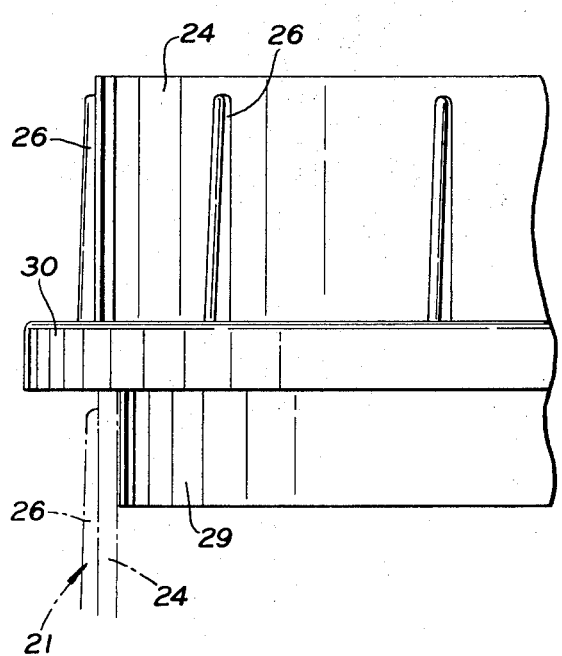
FIG. 10 is a partial elevational view and partial sectional view of the assembled sieve according to the concepts of the present invention.
Figure 10:
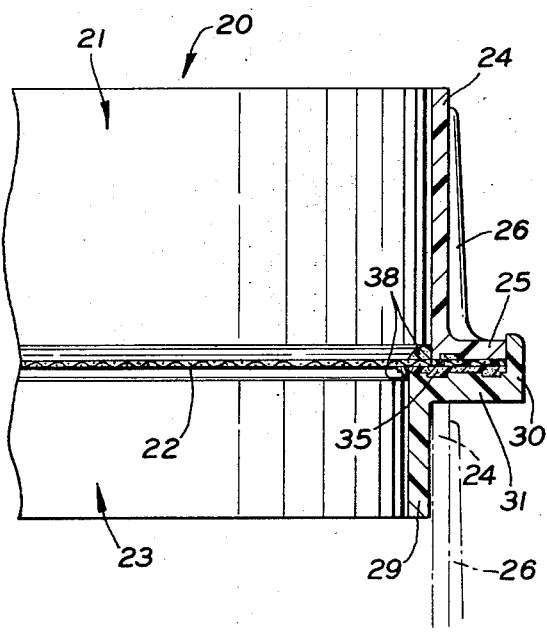

In use, the sieves 20 are stacked in a standard shaking apparatus indicated generally by numeral 40 in FIG. 1. The manner in which sieves 20 are stacked with other like sieves is best shown in FIG. 10 wherein an upstanding side portion 24 is shown in phantom lines as snugly surrounding the annular leg portion 29 of the sieve 20 positioned above. The radially extending flange or lip 31 provides a readily accessible gripping surface when the sieves are to be unstacked.

The shaking apparatus 40 comprises an adjustable archway portion 41 extending from a base 42. A mounting flange 43 projects from base 42 and holds a motor 44 thereon. In operation, the desired number of sieves 20 are stacked on base 42, each successively lower sieve having a finer screen cloth. Motor 44 is actuated after the sieves have been clamped in place within archway 41 and a material to be separated is fed into the top sieve. The material will separate and pass through the sieves until it reaches a sieve through which it cannot pass. After a period of vibration, all material will be separated and ready for its intended use.

It has been found that a sieve 20 constructed according to the concepts of the present invention will give equal or better separating results; will have a longer screen life; will withstand the pressures of constant vibrating forces; will readily nest with and be separable from other like sieves; and will, when it finally has served its useful life, be economically disposable; thus carrying out the afore-mentioned objectives and substantially improving the sieve art.

We claim:

1. In combination, a first sieve and a similar sieve adapted to be stacked with said first sieve for separating materials, said first sieve comprising, a first annular plastic frame member having an annular flange and downwardly directed side portion, a second annular plastic frame member having an annular flange and an upstanding side portion for receiving material to be separated, said upstanding side portion being of a size to snugly surround the downwardly directed side portion of a first frame member of said similar sieve, the annular flange of said first frame member and the annular flange of said second frame member extending radially outward beyond said upstanding side portion and downwardly directed side portion to present means to grip said first sieve for removing said first sieve from said similar sieve and for presenting opposed mating faces, and a screen cloth positioned between and attached to said mating faces.

2. A sieve according to claim 1, wherein said screen cloth is attached to said mating faces by an adhesive and at least one of said mating faces includes means in the form of at least one annular groove therein for receiving some of said adhesive to deeply bond said screen cloth to said one of said mating faces.

3. A sieve according to claim 2, wherein said adhesive is an epoxy compound.

4. A sieve according to claim 3, wherein said epoxy compound has an epoxide equivalent in the range of 175–210.

5. A sieve adapted to be stacked with a like sieve for separating materials comprising, a first annular plastic frame member having an annular flange and downwardly directed side portion, a second annular plastic frame member having an annular flange and an upstanding side portion for receiving material to be separated, said upstanding side portion being of a size to snugly surround the downwardly directed side portion of a first frame member of the like sieve, the annular flange of said first frame member and the annular flange of said second frame member extending radially outward beyond said upstanding side portion and downwardly directed side portion to present means to grip the sieve for removing the sieve from the like sieve and for presenting opposed mating faces, a screen cloth positioned between and attached to said mating faces, one of said mating faces extending radially inwardly of said upstanding side portion to form a corner above the end of said downwardly directed side portion, and a silicone rubber material on the radially inward extension of said upstanding side portion and at the inner periphery of the junction between said downwardly directed side portion and said screen cloth.

6. A sieve according to claim 5, wherein at least one of said first and second frame members has supporting ribs spaced circumferentially thereon.

* * * * *